Jan. 24, 1956     R. L. PARRETTE ET AL     2,731,828

GELATION TIMING DEVICE

Filed Feb. 6, 1951

INVENTORS
JOHN S. BILLHEIMER
RICHARD L. PARRETTE
BY
D. Gordon Angus
ATTORNEY

United States Patent Office 2,731,828
Patented Jan. 24, 1956

2,731,828

GELATION TIMING DEVICE

Richard L. Parrette and John S. Billheimer, Pasadena, Calif., assignors, by mesne assignments, to Aerojet-General Corporation, Cincinnati, Ohio, a corporation of Ohio Application February 6, 1951, Serial No. 209,594

1 Claim. (Cl. 73—150)

This invention relates to instruments and in particular to a timing device which determines the interval of time during which a resin has become gelled.

An object of our invention is to provide an automatic device capable of accurately determining the gelling interval of the resin even though the gelling period extends over a considerable period of time, for example, in excess of twenty-four hours.

The gelling point of a resin is normally the time during the course of polymerization in which the viscosity of the resin rises rapidly to an infinite value. In some cases a resin will gel in a relatively short time, in which case it is possible to ascertain the gelation period by observation. However, most resins require a long time before the gelling takes place, and in such cases it would require a series of continuous observations at regular intervals to determine when the actual gelation takes place.

The need for precise and automatic determination of the gelling time of a polymerization process has become important due to the extended uses to which slowly polymerizable resins have been put.

We have succeeded in developing a device which accurately determines without requiring any supervision, the interval at which a resin gels. A feature of the device is that several resins may be tested simultaneously and the time intervals during which polymerization occurs determined for each resin, even though the resins have unequal gelling time.

We accomplish this desirable result by providing a device which discharges a glass bead, or bead of any other substance insoluble in the resin, at regular intervals of time in each of a number of resin containers. As long as the resin in the receptacle is in its fluid or semi-fluid state the beads, which are normally heavier than the resin, will sink to the bottom of the container. As the resin begins to polymerize the viscosity will increase rapidly and the bead will sink less and less into the resin until gelling has completely taken place. At this point the viscosity of the resin will have reached an infinite value and the beads discharged by the device will remain on top of the polymerized resin.

The invention will be better understood with reference to the following description and accompanying drawings in which.

Figure 1:
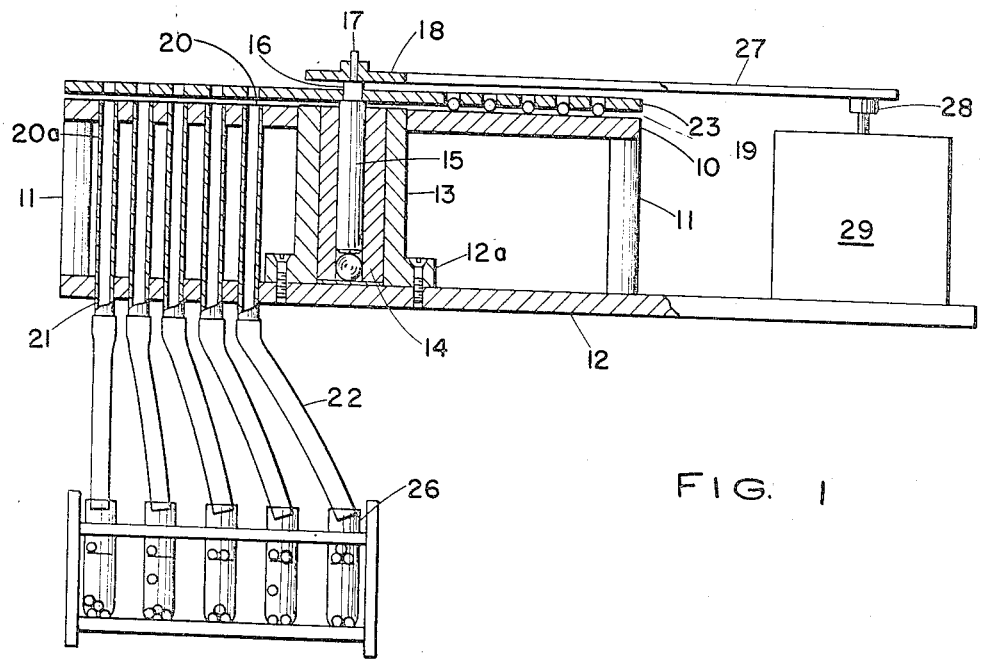
Fig. 1 represents a cross section view of the device taken on a diameter.

Referring to the drawing of Fig. 1, the device comprises essentially a subplatform 10, preferably circular in shape, and mounted on suitable supports 11 extending upwardly from a base 12. Base 12 is provided with a vertical bearing 13 which supports the central portion of subplatform 10. Bearing 13 comprises a housing 12a which supports a bushing 14 in which a shaft 15 rotates. Shaft 15 is either provided with a splined or squared end 16 and beyond the square or splined end 16 there is provided an axial extension of the shaft 17 which is threaded or keyed to accommodate a pulley wheel or gear 18. The shaft 15 rests preferably on a ball which in turn rests on base 12 in the hole formed by the bushing 14. The distance between the end of the uniform portion of shaft 15 and subplatform 10 is preferably made small to allow a small clearance 19.

A disc 23 having a splined or rectangular hole 24, corresponding to the splined or rectangular portion of projection 16 of the shaft 15, is divided radially in a plurality of equi-angular portions. Each one of these radii is provided with a plurality of small holes 25 at the required intervals. The holes 25 continue through the thickness of the plate. The disc is secured to the splined or square shaft by any suitable fastener which would thread on extension 17.

A plurality of holes 20 are arranged on a radius of the subplatform 10. These holes correspond in spacing to the holes on the diameter of the disc 23. Each hole 20 is made larger than the hole in the disc 23 and a tube 20a passes through each hole 20 and is flush with the upper surface of subplatform 10. Tubes 20a project through the bottom of the base 12 a short distance. A plurality of flexible tubes 22, of slightly larger diameter than the tubes 20a, are attached to projections 21 and lead to a corresponding number of test tubes, or other receptacles, containing resins to be polymerized. The level of the resin in each test tube is substantially uniform. A number of spherical beads of glass, or similar material not affected by the resin, are deposited in each of the holes of the disc 23. Since the clearance between the bottom of the disc 23 and the top of subplatform 10 is very small the spherical beads will remain in the hole in disc 23 until they reach their corresponding opening 20 in subplatform 10. At this point the beads will fall through the opening, travel down the tube 20a and will be conducted by flexible tube 22 to drop into the respective resin container 26.

Fig. 1 shows the manner in which the beads will arrange themselves in a resin during a test. In tube 26 the first two beads which came into contact with the resin settled to the bottom showing that at the time these beads were released the resin had not as yet polymerized. The subsequent three beads are found to rest on the top surface of the resin showing the polymerization occurred after the second bead was released but before the third bead was discharged. The number of the beads at the bottom of any sample of resin makes it possible to determine the period during which the resin polymerized.

The disc 23 and shaft 15 are rotated by a constant speed motor provided with a suitable reduction gear 29 and a pulley 28 secured to the shaft of the reduction gear. A belt 27 passes around pulley 28 and drives a pulley 18 secured to shaft 15. A gear or chain arrangement may be substituted for the pulley and belt drive, if desired. A preferred form of motor is a clock mechanism which completes one revolution in twelve or twenty-four hours.

By selecting the diameter of the pulleys 18 and 28 it is possible to cause the disc 23 to complete one revolution in any desired period of time. Since the bead receptacles drilled in disc 23 are located at equi-angular points, the time interval at which each bead is discharged will be constant.

The base 12 may be mounted on suitable legs, if desired, or may be rested on a shelf-like member (not shown) which would place the base 12 above the tops of the tubes 26 a sufficient distance to insure that the spherical beads will drop immediately into each tube 26 upon being discharged when the orifices 25 come in contact with the holes 20.

Figure 2:
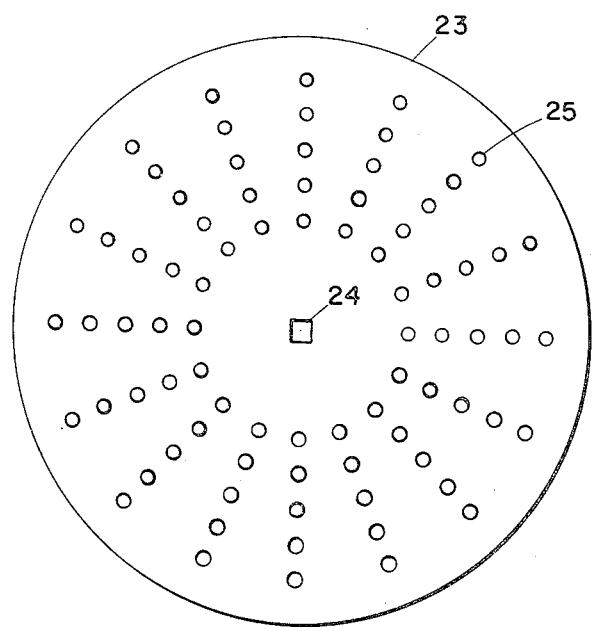
Fig. 2 is a plan view of the revolving plate with the bead receptacles shown thereon.

The device shown in Fig. 2 is designed for use with apparatus capable of conducting five tests simultaneously.

However, by increasing the number of holes on a radius and conduits, it is possible to make the apparatus applicable for testing a larger number of samples.

The device is constructed so that a bead is dropped simultaneously into each of the five resin containers at regular intervals of time. In the event that the resins require a long time before polymerization takes place, it is possible to alter the rate of angular rotation of the bead carrier by merely changing the gear or pulley combination, thus instead of completing one revolution in twenty-four hours the bead carrier can be made to complete one revolution in a longer period of time such as thirty-six, forty-eight, or seventy-two hours. If the resins are expected to polymerize rapidly the speed of the bead carrier can be increased by proper gearing or pulleys so that a complete revolution takes place in a shorter time such as sixteen or eighteen hours.

We claim:

A timing device for determining the gelation period of a resin comprising: a fixed platform, means for supporting said platform, bearing supporting means projecting upwardly from said platform, a shaft bearing within said bearing supporting means, a second fixed platform supported by said bearing supporting means, a movable shaft within said shaft bearing, said shaft resting on a second bearing means located at the bottom of said shaft bearing, the upper end of said shaft extending beyond the end of said shaft bearing and said second fixed platform, means for securing a disc to said shaft, said disc just clearing said second fixed platform and being provided with a plurality of groups of holes on radii, each group of said holes having their centers on a same radius, said radii being spaced a uniform angular distance apart on said disc, driving means connected to the end of said shaft above said disc securing means, a plurality of tubes having their axes falling on a straight line positioned to correspond to a row of holes in said disc, said tubes extending through said second fixed platform and having an opening flush with the upper surface of said second fixed platform, a plurality of resin sample containers, means for communicating said tubes with corresponding ones of said sample containers, a timed constant speed driving means, and means for connecting said constant speed driving means to the driving means on the end of said shaft.

References Cited in the file of this patent

UNITED STATES PATENTS

| | | |
|---|---|---|
| 2,129,043 | Bortsch | Sept. 6, 1938 |
| 2,198,137 | Suppiger | Apr. 23, 1940 |
| 2,252,572 | Lang | Aug. 12, 1941 |
| 2,281,324 | Preston | Apr. 28, 1942 |
| 2,457,220 | Fowler et al. | Dec. 28, 1948 |
| 2,550,067 | Hewson | Apr. 24, 1951 |

FOREIGN PATENTS

| | | |
|---|---|---|
| 17,482 | Great Britain | 1913 |